United States Patent [19]
Dodd

[11] 3,911,866
[45] Oct. 14, 1975

[54] MOTORIZED BIRDIE RIDE
[76] Inventor: Louie R. Dodd, 1553 Irving Ave., St. Louis, Mo. 63133
[22] Filed: Sept. 3, 1974
[21] Appl. No.: 502,910

[52] U.S. Cl. ................................................ 119/26
[51] Int. Cl.² ........................................ A01K 31/12
[58] Field of Search ....................................... 119/26

[56] References Cited
UNITED STATES PATENTS
| 1,998,787 | 4/1935 | Nyhagen | 119/17 |
| 2,487,087 | 11/1949 | Anderson | 119/26 |

Primary Examiner—Hugh R. Chamblee
Attorney, Agent, or Firm—Glenn K. Robbins

[57] ABSTRACT

A motorized merry-go-round type ride for pet birds operated by a battery driven electric motor having its shaft centrally connected to a rigid bar extending outwardly therefrom to support specially designed bird supporting perches at each end thereof, the bar being resiliently supported relative to the motor shaft and swingable slightly thereabout to effect the closing of electrical contacts associated therewith upon a bird sitting on either of the perches to effect the energization of the motor and the rotation of the bar.

4 Claims, 6 Drawing Figures

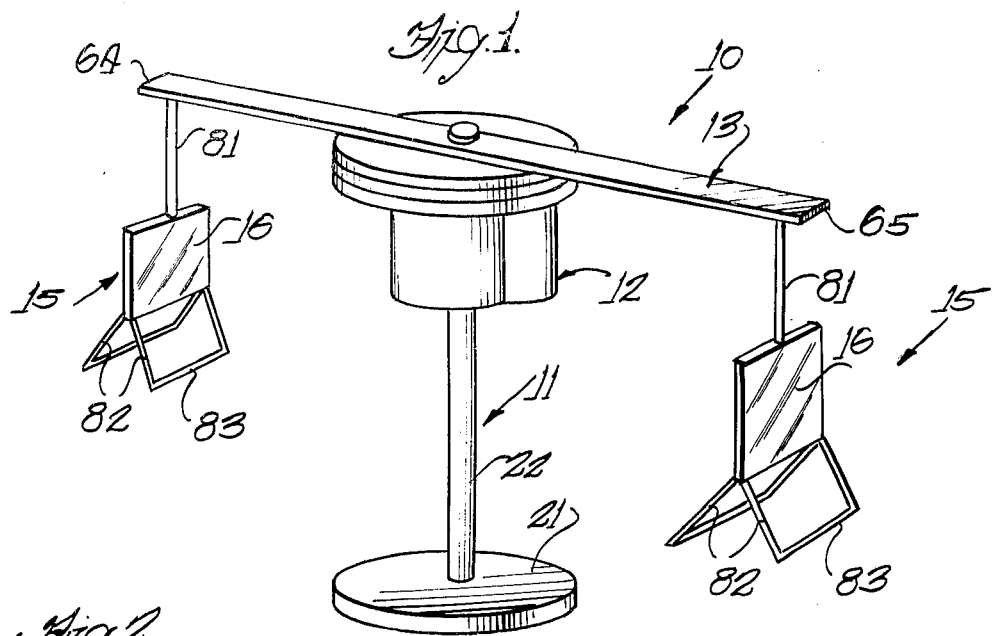
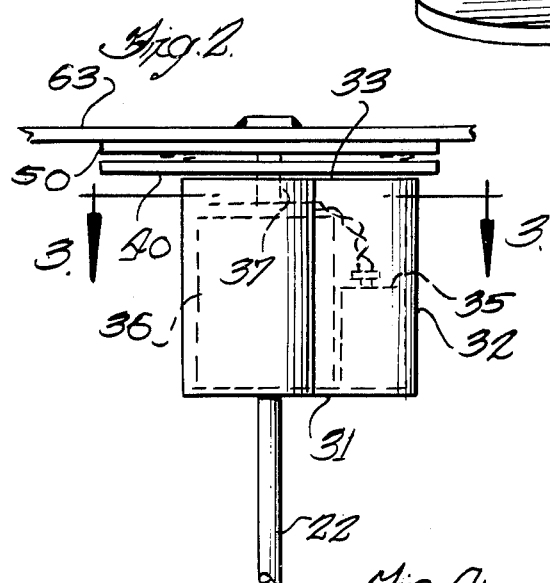
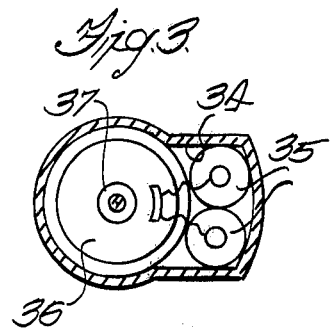
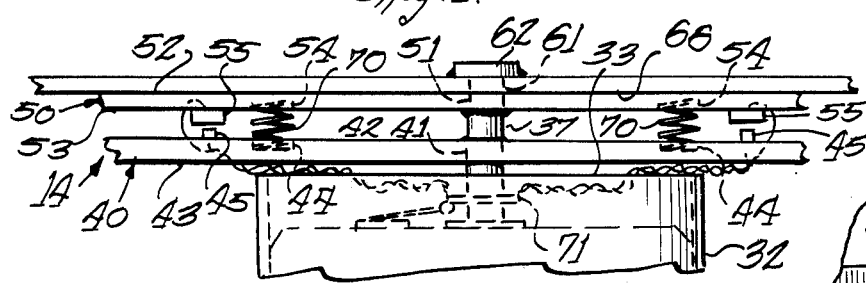
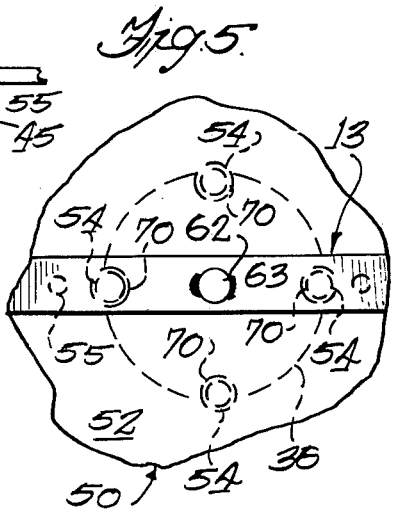
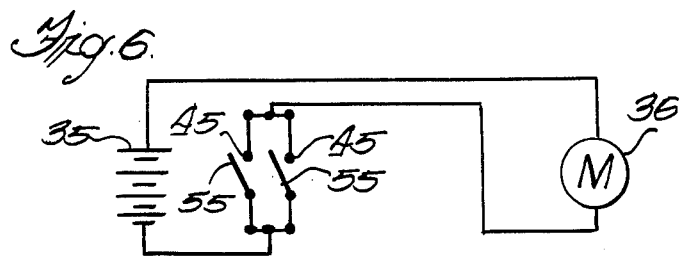

MOTORIZED BIRDIE RIDE

BACKGROUND OF THE INVENTION

1. Field of the Invention

This invention relates generally to pet accessories and more particularly to a novel merry-go-round type ride for pet birds which is motorized and which is energized upon a bird sitting on the device and automatically de-energized once the bird leaves the device.

2. Description of the Prior Art

The pleasure and companionship of birds as pets is well known, with the owners of such birds constantly seeking new and different ways to both entertain the birds as well as to train the birds for further amusement and entertainment of the owners. Accordingly, there are known in the art various types of ferris wheels, ladders, and other such devices intended to be placed in bird cages or to have birds use the same for both the amusement of the bird as well as the amusement of the owner. However, the birds soon tire of this such that the device falls into nonuse.

It would thus be desirable to provide a device enjoyable for use by the birds and entertaining and amusing to the bird owner and of which neither the bird or the owner will tire.

SUMMARY OF THE INVENTION

The present invention provides a novel mechanically operated battery driven motorized merry-go-round for use by one or more birds and operable in a manner such that when a bird sits on the device it will automatically begin to rotate, and when the bird leaves the device it will automatically stop rotation.

It is a feature of the present invention to provide a motorized birdie ride.

A further feature of the present invention is the provision of a ride for pet birds which is relatively simple in its construction and which therefore may be readily manufactured at a relatively low cost and by simple manufacturing methods utilizing readily available materials such that the ride may be retailed at a sufficiently low price to encourage widespread use thereof among pet bird owners.

Still a further feature of the present invention provides a bird ride which is easy to use and reliable and efficient in operation, and which is of a rugged and durable construction such that it may be guaranteed by the manufacturer to provide many years of intended usage and enjoyment to the bird owner.

Yet still a further feature of the present invention provides a bird ride which is of an aesthetically pleasing and refined appearance and which includes special perches for a bird to easily land thereonto and grip thereto during the operation of the ride.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the ride of the invention;

FIG. 2 is a fragmentary front elevational view of the central portion of the ride;

FIG. 3 is a cross-sectional view taken along Line 3—3 of FIG. 2;

FIG. 4 is an enlarged fragmentary view of a central portion of the ride showing the bar support and electrical contact portions associated therewith;

FIG. 5 is a partial top plan view of FIG. 4; and

FIG. 6 is an electrical schematic view of the electrical circuitry of the ride.

DESCRIPTION OF THE PREFERRED EMBODIMENT

Referring now to the drawings in detail there is illustrated a preferred form of a motorized birdie ride constructed in accordance with the principles of the invention and designated generally in its entirety by the reference numeral 10 and which is comprised of a stand 11, a motor and battery housing 12, a rigid bar 13, bar support and contact plates 14, and a pair of bird perches 15 supported at each end of the bar 13 and extending vertically downward therefrom and including option mirrors 16 associated therewith.

The stand 11 includes a flat circular base member 21 with a supporting post 22 projecting vertically upright from the center thereof and terminating at its top end in the bottom surface 31 of housing 12 which includes side walls 32 and top end 33 defining a compartment 34 interiorly thereof. Disposed in vertical upright positions in compartment 34 are a pair of batteries 35 and an electric motor 36 having its shaft 37 projecting upright therefrom through the top housing end 33 and through central apertures 41 and 51 of plates 14 and through central aperture 61 of rigid bar 13 to be secured by plate 62 fastened on the top surface 63 of the longitudinally elongated flat rigid bar 13 having opposite ends 64 and 65. The rigid bar 13 is thus drivingly connected to the shaft 37 for rotation therewith.

The plates 14 consist of a lower plate 40 and an upper plate 50, each of which are of a flat circular configuration having an identical thickness and diameter and disposed in vertical overlying spaced apart juxtaposition with each other. The bottom plate 40 has a top surface 42 and a bottom surface 43, the top plate 50 having a bottom surface 53 and a top surface 52, the top surface being in engagement with the bottom surface 66 of rigid bar 13. The top surface 42 and bottom surface 53 are provided with radially disposed circumferally spaced apart four axially aligned recesses 44 and 54, the recesses being spaced apart 90° from each other, with each set of confronting recesses having extending therebetween a cylindrically coiled spring 70. The springs 70 retain the plate 50 resiliently biased away from the plate 40. At least one pair of the springs 70 are disposed in alignment with the rigid bar 13.

Spaced radially outward from the pair of springs 70 aligned with rigid bar 13 are a pair of stationary sets of spaced apart contacts 45 and 55 which are normally spaced apart from each other, the contacts being connected by suitable electrical wiring to a rotating conventional type of contact disc 71 mounted on motor shaft 37 inwardly of housing 32 and to which the batteries 35 are electrically connected. The disc 71 is of a conventional slip ring type construction having four individual electrically conducting concentrically disposed rings mounted thereon with a stationary contact associated with each ring and being slidable thereover, such as by use of a carbon brush and spring arrangement, the contacts and through it to the battery shown in FIGS. 3 and 6, 55 being connected to one of the stationary contacts, the contacts 45 being connected to another of the stationary contacts, with the remaining two stationary contacts on the motor side being connected to the electrical circuit for example, one such contact being placed electrically between contact 45 and the motor and the other between the motor and the battery on the side opposite to contact 55 such that any time any of the contacts 55 engage any of the contacts 45 the electrical circuit is completed and the motor will be energized.

The perches 15 are suspended by rods 81 downwardly from ends 64 and 65 respectively of rigid bar 13, the perches including optional mirrors 16 which have projecting outwardly therefrom in a generally inverted V-shaped configuration side supports 82 having horizontal perch members 83 extending therebetween and on which a pet bird may perch while riding on the ride.

In operation, upon a bird landing on either of the perches 83 or on rigid bar 13 adjacent either end 64 or 65 thereof, the bar through a slight degree of resilient of the bar and the upper plate 50 is tilted downward by the weight of the bird against the tension of spring 70 to compress the spring and effect the engagement of contacts 55 and 45, this closing the electrical circuit to energize motor 36 to rotate the plates 40 and 50 along with the rigid bar 13 about their central axis to provide a merry-go-round type ride for the pet bird. As long as the bird remains on the perch or rigid bar the contacts will remain in engagement and the ride will remain energized.

Upon the bird flying from the ride, the springs 70 will act to effect separation of previously closed contacts 45 and 55 to de-energize the electric motor 36 and thus stop the ride 10 until a bird again lands in a position thereon to effect energization of the motor and starting of the ride.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A merry-go-round ride for birds, said ride comprising an electric motor, a motor driven shaft extending vertically, an elongated rigid member centrally connected to said shaft and driven thereby to rotate about a vertical axis, the rigid member supporting at opposite ends perches for birds to alight upon and means responsive to the weight of a bird upon perch to activate an elctrical circuit to energize the motor, said last named means deactivating said circuit upon the release of the bird from said perch the electrical circuit activating means comprising a pair of vertically spaced upper and lower flat plates centrally connected to the motor shaft, said upper plate being connected to the elongated rigid member and adapted to be tilted toward the other plate by the weight of a bird alighting on a perch, spring means biasing the plates apart from one another, and normally open electrical contacts in aligned registry with one another adapted to contact one another when the weight of a bird upon the perch causes the plate connected to the elongated rigid member to the tilted.

2. The ride of claim 1, in which a vertically positioned mirror is supported at the opposite ends of and below said elongated rigid member and said perch is connected underneath said mirror for bird viewing self-image relation.

3. The ride of claim 2, in which said mirror is an option mirror and a pair of perches are connected in downwardly diverging relation at the bottom of the mirror.

4. The ride of claim 1, in which the spring means comprise coil springs seated in recesses in said plates and a slip ring assembly is connected to the motor shaft having contact means in sliding engagement with said normally open contact means to provide an energizing circuit for said motor.

* * * * *